April 26, 1927.
J. COOK
CAN STEAMER
Filed Sept. 24, 1925   2 Sheets-Sheet 1
1,626,452
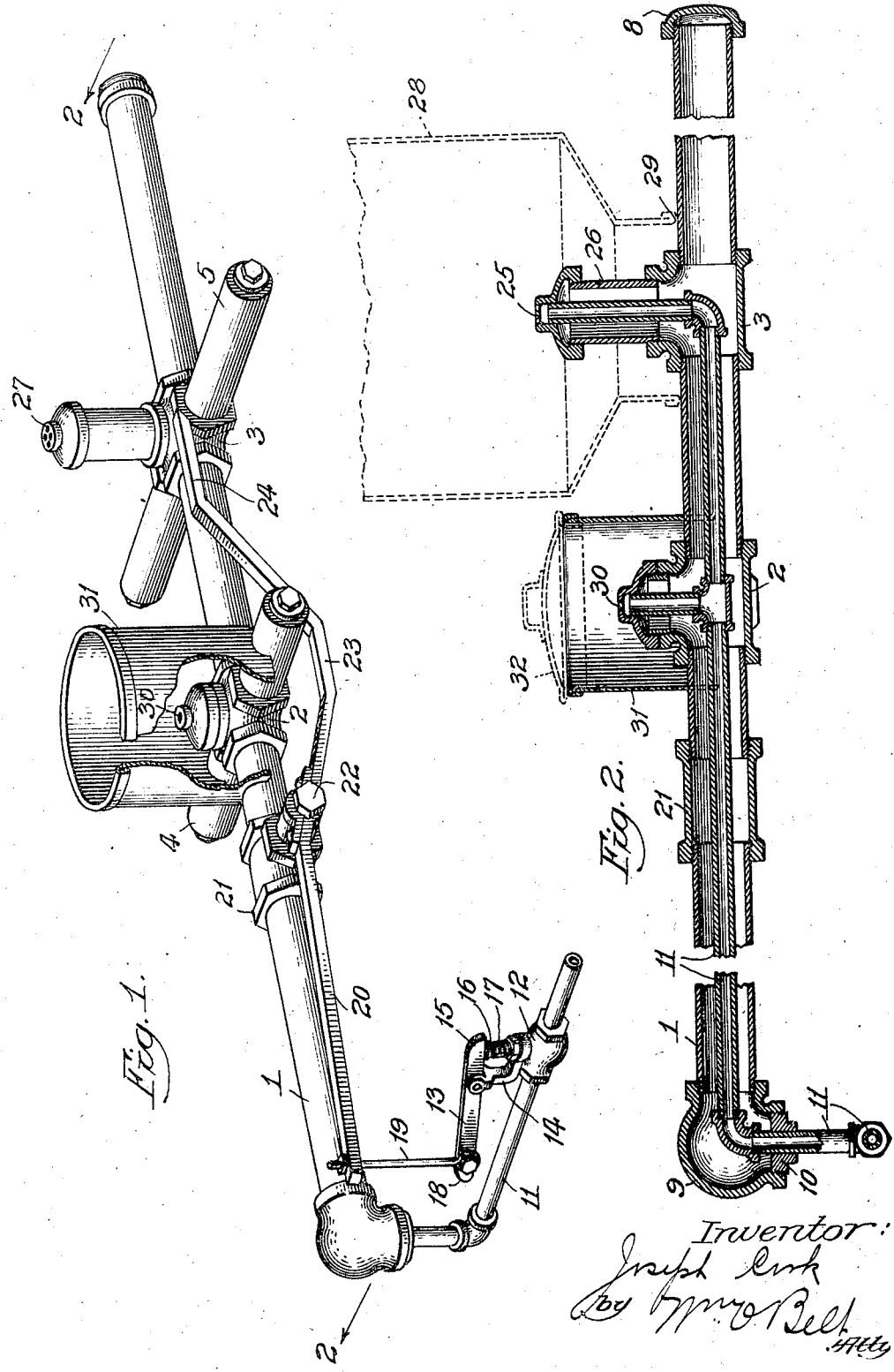
Inventor:
Joseph Cook
by Wm O Bell
Atty.

April 26, 1927.  J. COOK  1,626,452

CAN STEAMER

Filed Sept. 24, 1925   2 Sheets-Sheet 2

Inventor:
Joseph Cook
By Wm. O. Bell
Atty.

Patented Apr. 26, 1927.

1,626,452

UNITED STATES PATENT OFFICE.

JOSEPH COOK, OF CHICAGO, ILLINOIS, ASSIGNOR TO BLUE VALLEY CREAMERY COMPANY, OI CHICAGO, ILLINOIS, A CORPORATION OF DELAWARE.

CAN STEAMER.

Application filed September 24, 1925. Serial No. 58,464.

When cans of milk are received at a creamery they are emptied into a suitable tank or other receptacle and then the empty cans are sterilized and returned. A substantial amount of milk or cream adheres to the interior of the can and the cap and this milk and cream is usually wasted. In a large creamery handling many cans of milk the total of this waste is quite large. Various forms of mechanisms have heretofore been devised for this purpose. It is the object of my invention to provide novel, improved means of simple and efficient character for recovery of the milk and cream which is otherwise wasted.

More specifically the object of my invention is to provide a supporting structure constituted by the pipes themselves through which the steam passes, and which may be placed on top of a tank and upon which may be set a can with its neck down, the act of setting the can in place causing a jet of steam to enter the can and remove the milk and cream from the walls thereof, which will fall into the tank. Means is also provided to support the cap of the can in position to be acted upon by another jet of steam for removing the milk and cream from the surface thereof, and this also will fall into the tank.

In the accompanying drawings in which I have shown a selected embodiment of my invention;

Fig. 1 is a perspective view of one unit of my invention.

Fig. 2 is a longitudinal sectional view on the line 2—2 of Fig. 1.

Figure 3:
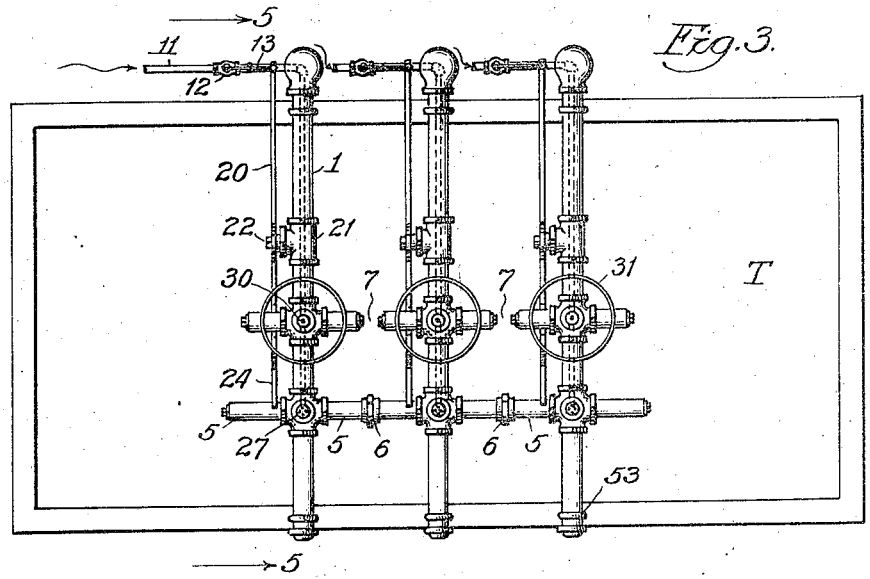
Fig. 3 is a plan view of the top of a tank showing a battery of units embodying my invention in place thereon.

Referring now to the drawings and particularly to Figs. 1 and 2, the numeral 1 designates a supporting member, which is preferably made in the form of a pipe and in which are disposed cross connections 2 and 3, by means of which transverse pipes 4 and 5 may be connected to the pipe 1. When the units shown in Figs. 1 and 2 are arranged in a battery, as shown in Fig. 3, these transverse pipes may be either connected, as shown at 6, or they may be left disconnected, as shown at 7 in Fig. 3, the connection being made in order to brace and strengthen and properly space the various units. Each pipe 1 is preferably closed at one end by a cap 8 and is provided at its other end with an elbow 9 closed by a plug 10.

Disposed within the pipe 1 is a steam pipe 11 which passes through an aperture in the plug 10 and is connected to any source of steam under pressure. Admission of steam to the pipe 11 is controlled by means of a suitable valve 12, which may be controlled by a lever 13 pivoted on a bracket 14 and having one end 15 engaging the valve stem 16. Upon depression of the end 15 of the lever 13 the valve 12 will be opened and upon raising of the end 15 the valve stem will be urged upwardly by means of a coil spring 17 to close the valve.

Connected to the other end 18 of the lever 13 by a link 19 is an actuating lever 20 pivotally mounted upon the pipe 1. This pivotal mounting may be readily effected by providing a T connection 21 in the pipe 1 and closing one leg thereof with a suitable plug on which may be secured the pivot 22. Beyond the pivot 22, the lever 20 is depressed as at 23 so as to pass beneath the pipes 4 and its other end 24 is raised to an elevation which is suitable for a purpose which will presently be described.

A suitable nozzle 25 is provided at the end of the pipe 11 and surrounded by a casing 26 to protect the nozzle from damage due to careless handling of the cans. This nozzle 25 is of a proper height and has a plurality of apertures 27 therein so disposed as to thoroughly spray the interior of a can 28 with live steam when such a can is placed in the position shown in dotted lines in Fig. 2. It is plain that such a can rests upon the edge 29 of its neck upon the supporting pipes 1 and 5 and when it is so placed the edge of the neck will engage the end 24 of the lever 20 and thus cause the valve 12 to open and admit steam to the nozzle 25. A second nozzle 30 is disposed above the cross connection 2 and is surrounded by a casing 31 of a proper diameter to receive a cap 32 of a milk can. It will be obvious that when the valve 12 is opened by the placing of a can 28 in position steam will pass through both of the nozzles 25 and 30, thus cleaning the milk and cream from the walls of both can and cap. This milk and cream will drop into the tank over which the supporting pipes and nozzles are placed and will consequently be recovered. At the same time the interior of the cans and caps will be thoroughly sterilized.

Figure 4:
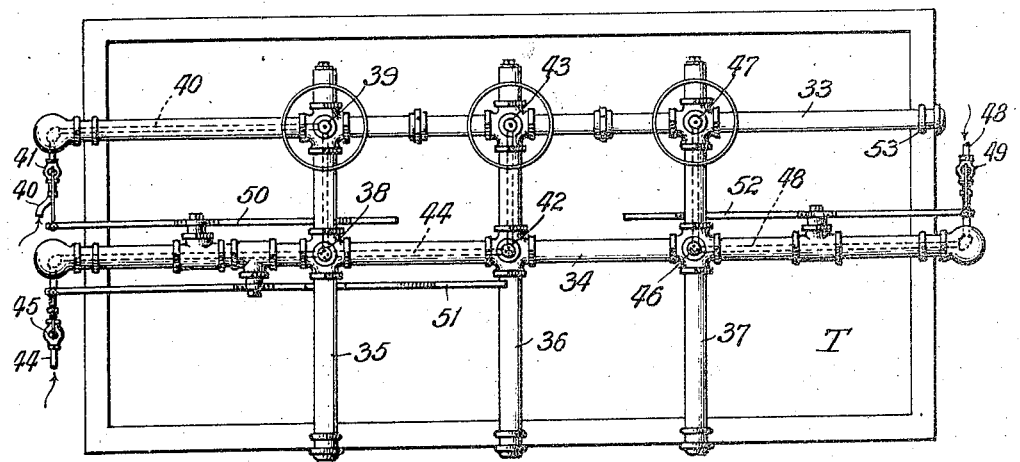
Fig. 4 is a plan view of the top of a tank showing another arrangement of units each embodying my invention.
Figure 5:
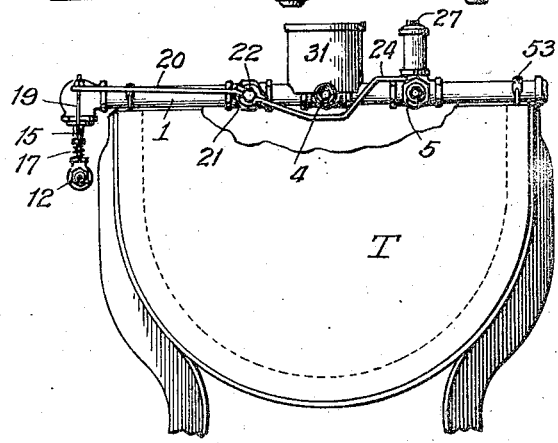
Fig. 5 is a section on the line 5—5 of Fig. 3.

In Fig. 3 I have shown one arrangement of the various units in a battery wherein the transverse pipes 5 are connected at 6. Another arrangement is shown in Fig. 4 wherein the steam is supplied to the ends of the tank rather than to the sides, as shown in Fig. 3. In this latter arrangement there are provided two longitudinal supporting pipes 33 and 34 connected to transverse pipes 35, 36 and 37 by suitable cross connections. In this arrangement the nozzles 38 and 39 receive their steam from the pipe 40, the supply being controlled by the valve 41; the nozzles 42 and 43 receive their steam through the pipe 44 controlled by the valve 45; and the nozzle 46 and 47 receive their steam through the pipe 48, the supply being controlled by the valve 49. The valves 41, 45 and 49 are controlled respectively by levers 50, 51 and 52 identical in principle and operation with the lever 20.

I have shown the units as being connected together and secured permanently to the top of the tanks by any suitable means such as U-bolts 53, but it is of course obvious that they may be detached at will from the tanks and may if desired be made portable.

It will be noted that the parts constituting my present improvement are separate from and readily removable bodily from the tank or receptacle, into which the milk and cream is deposited, and that the pipes are supported by the top of said receptacle.

From the above it will be apparent that I have provided a novel and improved means for recovering milk and cream which is normally left adhering to the surfaces of a milk can and its cap. The device may be readily applied with a minimum of labor and expense by a plumber or steamfitter and by the use of standard parts. Moreover, the invention permits of a very flexible arrangement in that any required number of units may be employed and a wide variety of arrangements is possible as exemplified in Figs. 3 and 4. Other arrangements will no doubt suggest themselves to those skilled in the art.

I am aware that changes in the form, construction and arrangement of parts may be made without departing from the spirit and without sacrificing the advantages of the invention and I reserve the right to make all such changes as fairly fall within the scope of the following claims.

I claim:

1. Can steaming means comprising a pipe for removable support upon a receptacle, said pipe being provided with an upwardly directed nozzle and a lateral pipe communicating with the first-named pipe to form a support for a receptacle, a pipe extending into the first-named pipe and connected with a source of steam, and a system of pivoted connected levers connecting said valve and actuated by the weight of said last named receptacle for opening and closing said valve.

2. Can steaming means comprising a steam pipe for removable support upon a receptacle, and lateral branches from said pipe, said pipe and branches provided with upwardly directed nozzles, a pipe entering said steam pipe connected to said nozzles and adapted for connection with a source of steam, a pivoted lever for controlling the flow of steam through said nozzles, and a pivoted lever connected with the first-named lever and having one end mounted for actuation by the weight of a can placed over a nozzle.

3. Can steaming means comprising a steam pipe for removable support upon a receptacle, said pipe being provided with an upwardly directed nozzle and lateral branches connected with the first named pipe and having upstanding nozzles, the latter receiving steam from said steam pipe, the said branches adapted to form a support for the receptacles to be treated, a pipe entering the first-named pipe and connected with a source of steam, the lateral branches and nozzles receiving steam therefrom, a valve to control the flow of steam through said branches and nozzles, and a series of pivoted, connected levers to control said valve, the said levers being actuated to open the valve by the weight of the said receptacles.

JOSEPH COOK.